No. 864,618. PATENTED AUG. 27, 1907.
L. V. DELOCHE.
PIPE COUPLING.
APPLICATION FILED MAY 18, 1906.
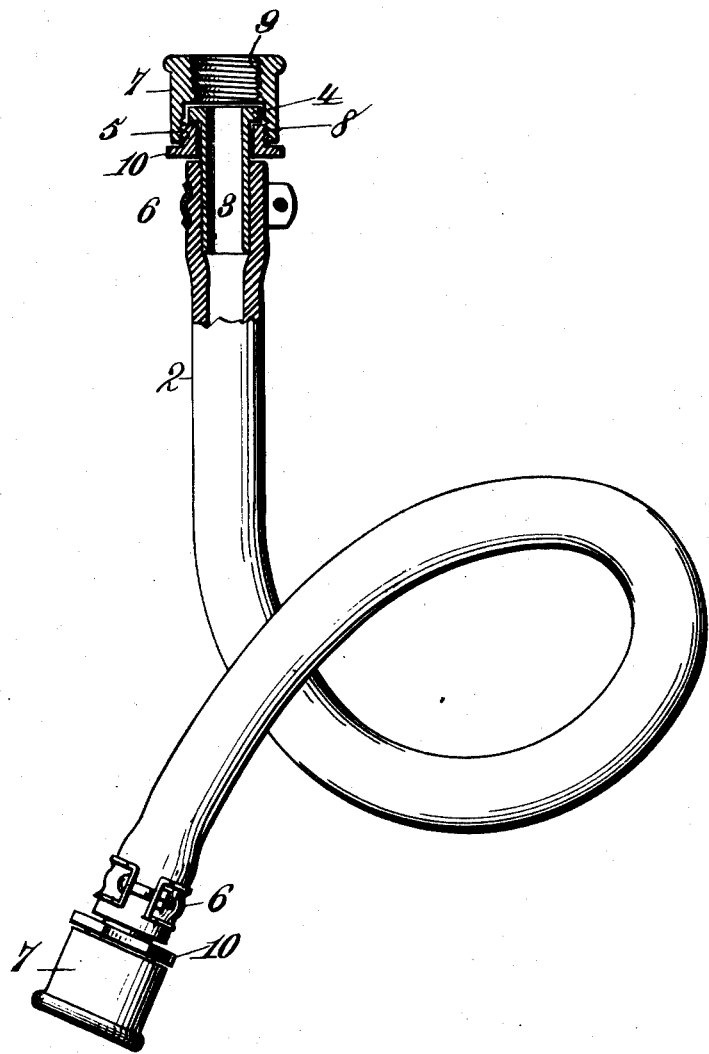

UNITED STATES PATENT OFFICE.

LOUIS V. DELOCHE, OF MONONGAHELA, PENNSYLVANIA.

PIPE-COUPLING.

No. 864,618.     Specification of Letters Patent.     Patented Aug. 27, 1907.

Application filed May 18, 1906. Serial No. 317,617.

*To all whom it may concern:*

Be it known that I, LOUIS V. DELOCHE, a citizen of the United States, residing at Monongahela, in the county of Washington and State of Pennsylvania, have invented new and useful Improvements in Pipe-Couplings, of which the following is a specification.

This invention relates to pipe couplings, the object being to provide a simple and effective article of this character which can be successfully employed in many different ways.

The device has a flexible body provided with coupling means for connection with a pipe or pipes. In the present case this flexible body has coupling heads at its opposite ends preferably of duplicate construction and which may be of any desirable character. The flexible body may be made of any desirable material, for example, rubber.

My invention can be used with advantage in the construction of pipe lines of any character through which liquid or fluid passes, but the same is applicable particularly for pipe lines for use in mines and other underground workings where deflections of such pipe lines are necessary to go over, under or around obstacles.

My invention obviates the necessity of employing the ordinary elbows where it is necessary to deflect the pipe from a straight line either upward, downward, or laterally.

In the drawing accompanying and forming part of this specification I show a form of embodiment of the invention which to enable those skilled in the art to practice said invention will be set forth in detail in the following description, while the novelty of said invention will be included in the claims succeeding said description.

In said drawing my coupling is shown in longitudinal central section.

A coupling embodying my invention includes in its make-up a flexible body which may be of any desired material, such as rubber. The flexible body shown is denoted by 2. It may be of any suitable length and diameter, and the same statement applies to the thickness of the stock composing said body. In the opposite ends of the flexible body 2 are fitted tubes as 3 ordinarily made from metal. The tubes project from the flexible body and terminate at their outer ends in annular rims 4. Between the opposite ends of the flexible body 2 and the rims 4 are rings as 5 generally made from metal and which surround and slide somewhat freely on the tubes. The rings are slipped over the tubes from the outer ends of the latter and then are moved along said tubes until they are contiguous or in proximity to the rims 4, following which the tubes are introduced into the open ends of the flexible body 2. The rims 4 prevent the displacement of the rings 5, while I prefer to employ some positive means to securely hold the flexible body and tubes in assembled relation. This means is shown as consisting of clamps as 6 surrounding the flexible body 2 where the same incloses the tubes so as to firmly relate said flexible body and tubes. The rings 5 abut against the opposite ends of the flexible body 2. It is believed that it will be understood that there is no threaded relation between the two rings 5 and the respective tubes 3. I connect with the two rings 5 sleeves as 7, these sleeves constituting really the heads of the coupling and being of duplicate construction so as to make them interchangeable. The sleeves 7 have bores of different diameters, the bores of greater diameter having threads as 8 to fit corresponding threads upon the exteriors of the respective rings 5, while the respective bores of less diameter have threads as 9 to receive the threaded ends of pipe sections constituting with the coupling a pipe line. The inner ends of the two sleeves 7 abut against annular shoulders as 10 on the inner portions of the two rings 5.

My coupling can be used in the construction of pipe lines for the conveyance of air, steam, gases, water, oils, and other fluids and liquids.

The flexible body will permit a pipe fitter or plumber to connect two sections together without the necessity of bringing adjoining pipe sections on a line. The pipe coupling can be made to bend to any angle so as to avoid the necessity of using elbows or the bending of metallic pipe to go around or over or under obstructions. The flexible body will absorb all vibrations due to the action of pump and other apparatus employed for forcing fluid or liquid through pipe lines; it will also take up the vibration caused by the velocity of the liquid or fluid through the pipe line. Under present conditions the threads of a coupling and the flanges of the union thereof are quickly destroyed by these vibrations. By virtue of my invention this difficulty is overcome. A pipe line involving my joint can be easily and quickly laid. By the coupling I avoid the friction which takes place by the use of ordinary metallic elbows and I can also make large, long bends so as to reduce the power necessary for forcing fluid or liquid through the pipe line.

The shoulders 10 are preferably shaped for coöperation with a suitable wrench which may be one of the ordinary character or a spanner wrench. I prefer to make the said shoulders 10 of polygonal form for such purpose, whereby a plumber or pipe layer can screw the rings 5 tightly into the respective sleeves 7. The shoulders 10 are also of greater diameter than the external diameter of the said sleeves so that when the parts are tightened up there will be tight or closed joints between said shoulders and sleeves.

In applying my coupling the sleeves are removed and are then independently screwed onto the adjacent ends of pipe sections forming part of a pipe line. The pipe sections should extend into the sleeve 7 to the place where the rim 4 is shown as located. The rings 5 are then screwed into the sleeves until the rims 4 abut against the said pipe sections to provide under ordinary conditions a water-tight joint. When the two joints are made the rims 4 will abut against the pipe sections and the rings 5 will abut against said rims. In some cases I may place gaskets of rubber or other suitable material within the rings 5 and around the tubes 3, although ordinarily this will not be necessary.

What I claim is:

1. A pipe coupling comprising a tubular body, a tube fitted in and projecting from said tubular body, said tube terminating at its outer end in an annular rim, a ring slidable on said tube wholly between the tubular body and said rim, said ring being externally threaded, internally plain and of equal internal diameter throughout its length, and a sleeve inclosing said rim and threaded to engage the threads on said ring, said sleeve having an internally threaded portion of less diameter than said rim, against which the latter substantially abuts and the ring having an external polygonal flange at its inner end of greater diameter than and to substantially abut against the inner end of said sleeve.

2. A pipe coupling comprising a tubular body, a tube fitted in and projecting from said tubular body, said tube terminating at its outer end in an annular rim and being of a uniform internal diameter and a uniform external diameter except at said rim, a ring slidable on said tube wholly between the tubular body and said rim, said ring being externally threaded, internally plain, and of equal internal diameter throughout its length, a sleeve inclosing said rim and threaded to engage the threads of said ring, said sleeve having an internally threaded portion of less diameter than said rim, against which the latter substantially abuts and the ring having an external polygonal flange at its inner end of greater diameter than and to substantially abut against the inner end of said sleeve, and a clip surrounding said tubular body and tube to firmly clamp the same together.

In testimony whereof I have hereunto set my hand in presence of two subscribing witnesses.

LOUIS V. DELOCHE.

Witnesses:
JAMES D. STEVENSON,
WALTER WALLACE.